Oct. 30, 1956   J. J. HEALY   2,768,632
PIPE RESTS OR HOLDERS
Filed Feb. 16, 1953
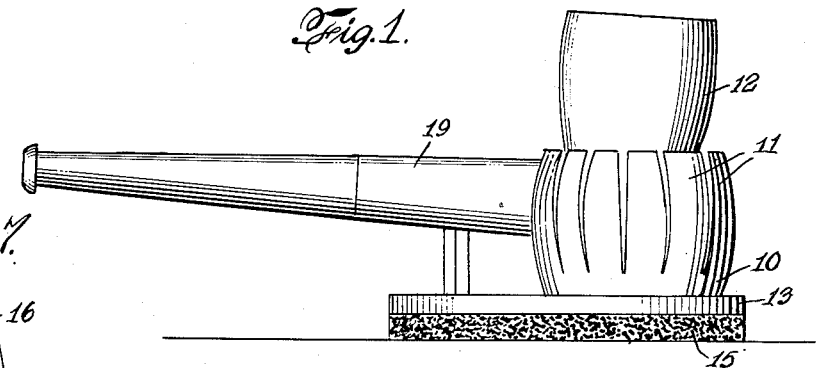
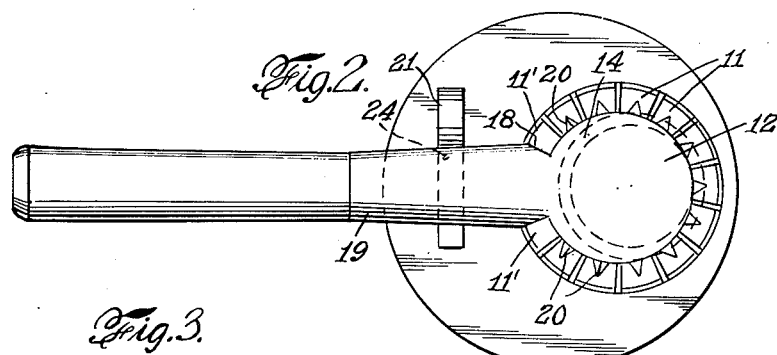
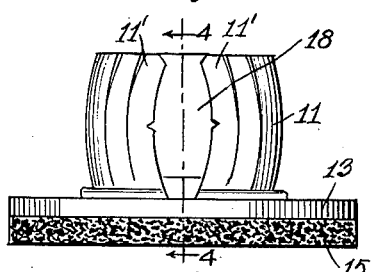
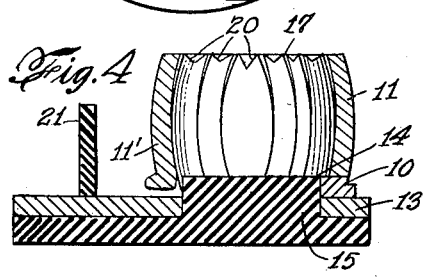
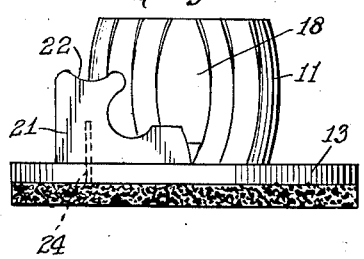
INVENTOR.
JAMES JOSEPH HEALY
BY
ATTORNEY

United States Patent Office 2,768,632
Patented Oct. 30, 1956

2,768,632

PIPE RESTS OR HOLDERS

James Joseph Healy, Bronx, N. Y.

Application February 16, 1953, Serial No. 337,060

2 Claims. (Cl. 131—260)

This invention relates to new and useful improvements in pipe holders, or pipe rests.

One object of my invention is to provide a pipe rest, which due to its special construction, as hereinafter set forth, will accommodate substantially any shape and size of pipe without regard to the form or configuration of the bowl of the pipe, or the thickness of the stem of the latter.

Another object of the invention is to provide a pipe rest which may suitably be carried around for use when necessary, and which has a bottom surface that will protect any surface upon which said pipe rest may be placed from damage by heat.

Another object of the provision of the bottom proper of the device with a rigid material such as hard rubber, wood or plastic is to give it sturdiness, and provide a separate surface or layer of any suitable material such as, for instance, foam rubber, sponge rubber, felt, etc., beneath said bottom as a protection against scratching a table and skidding thereon.

A further object of my invention is to employ a number of flexible members or fingers, made of a springy material such as rubber, plastic, etc., so arranged and constructed that they will be able to receive and embrace substantially any shape of pipe bowl, while at the same time a support for the stem of the pipe is arranged in such predetermined proximity to the receptacle of the pipe bowl that liquids therein will not run out through the mouthpiece.

A further object of my invention is to construct said fingers so that different parts thereof are especially adapted to grip differently shaped pipe bowls according to their width, while at the same time said fingers which are integrally connected near their lower circumference have a few fingers on each side nearest the opening in the receptacle for the pipe stem, loose, or not secured to the base or bottom of the support, thereby permitting a widening or enlargement of the entrance to the somewhat tubularly shaped receptacle for the pipe bowl, and incidentally, make sufficient space for the stem, if this should happen to be extraordinarily thick.

In addition, a few of the fingers on each side of said opening for the pipe stem are formed with tiny vertical slits inside and near their bottoms to further accommodate the placement of a pipe bowl in the pipe rest by facilitating the spreading of said fingers.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is a side elevation of a pipe rest, or holder.
Figure 2 is a top plan view of the same.
Figure 3 is a front elevation of the receptacle of the pipe bowl proper.
Figure 4 is a transverse sectional view, taken on the line 4—4 in Figure 3.

Figure 5 is a front elevation of the pipe-rest or holder shown in Figure 1.
Figure 6 is a detail view of Figure 5; while
Figure 7 shows in detail a finger of the bowl receptacle.

Referring more particularly to the drawing, Figure 1 illustrates a pipe rest or holder, which consists of a receptacle 10 having a number of flexible fingers 11 adapted to receive the bowl 12 of a pipe; said fingers are formed with an upper enlarged and slanting portion, respectively indicated by the numerals 16 and 17, adapted to securely grip said bowl, and at the same time facilitate the entrance of the latter to the receptacle.

The receptacle 10 is provided with a base 13 cemented thereto.

Suitable material 15, such as a heat absorbing material is so positioned as to be adapted to support the base of the pipe bowl in such a manner as to protect the base 13 from becoming too hot, the material also having a lower surface adapted to prevent sliding and in addition the material 15 serves to elevate the base 13 and prevent heat, which may be transferred from the wall of the pipe bowl to and through the fingers to the base, from reaching the supporting surface.

The receptacle is formed with a recess 18 at the front thereof adapted to receive the stem 19 of a pipe. Some of the fingers 11' upon each side of the recess 18 are not secured to the base 13 at the bottom, but to the adjoining fingers, which latter are themselves secured to the bottom, as shown distinctly in Figure 4, in order to impart an expanding or widening effect to said receptacle; the fingers are also each provided with a small vertical inner slit 20 in order to give further flexibility thereto and permit the entrance of a pipe bowl to the receptacle.

A rest 21 for a pipe stem is shown in Figures 5 and 6, said stem rest having an elevated portion 22 and a lower portion 23 in order to accommodate different stems of pipes. The said stem rest is pivotally secured to the base 13 at 24 as shown in Figure 2 out of alignment with the center line of the recess 18, and may be turned to accommodate the respective pipe stems according to their shape.

It is obvious that changes may be made in the form, construction and arrangement of the several parts as shown, within the scope of the appended claims, without departing from the spirit of the invention, and I do not, therefore, wish to limit myself to the exact construction shown and described herein.

What I claim as new, and desire to secure by Letters Patent of the United States, is:

1. A pipe rest comprising a base, a receptacle fixedly secured to the latter and adapted to receive the bowl of a pipe, said receptacle having flexible fingers separated at their top and integrally connected at their bottoms and being connected to the base, the latter being formed with an opening within said receptacle, and heat-absorbing material secured to the underside of said base and protruding through the opening in the receptacle, whereby to support the base of a pipe bowl; said material being adapted to prevent sliding, and to elevate said base so as to prevent heat from being transferred from the wall and fingers to the base and reaching the supporting surface.

2. A device of the class described, comprising, in combination, a base, a receptacle for receiving a pipe bowl, said receptacle having an opening in the side thereof, and means for supporting the stem of said pipe including separable, flexible fingers forming the wall of said receptacle adapted to engage said pipe bowl, a bracket pivoted to the base at a point situated laterally a distance from the center line of said opening, said bracket being formed with two upwardly extending portions of uneven heights adapted to support, either a straight or a curved-stem pipe with the bowl thereof in a vertically upright position.

References Cited in the file of this patent

UNITED STATES PATENTS

| | | |
|---|---|---|
| D. 110,885 | Springer et al. | Aug. 16, 1938 |
| 994,913 | Elliott | June 13, 1911 |
| 1,112,575 | Stricker | Oct. 6, 1914 |
| 1,488,991 | Lettre | Apr. 1, 1924 |
| 1,589,572 | Seinecke | June 22, 1926 |
| 1,974,246 | Littell | Sept. 18, 1934 |